United States Patent [19] [11] 4,424,888
Chouings [45] Jan. 10, 1984

[54] SHOE AND DRUM BRAKE
[76] Inventor: Leslie C. Chouings, Holly Croft, Bourton, Rugby, Warwickshire, England
[21] Appl. No.: 227,761
[22] Filed: Jan. 23, 1981

Related U.S. Application Data
[63] Continuation of Ser. No. 10,531, Feb. 9, 1979, abandoned.

[51] Int. Cl.³ .............................................. F16D 51/20
[52] U.S. Cl. .............................. 188/331; 188/196 BA
[58] Field of Search ............... 188/331, 332, 333, 342, 188/328, 181 T, 79.5 GE, 79.5 GC, 79.5 GT, 79.5 P, 79.5 S, 79.5 SC, 196

[56] References Cited
U.S. PATENT DOCUMENTS

| 1,799,227 | 4/1931 | Gunn | 188/328 |
| 1,919,519 | 7/1933 | La Brie | 188/328 |
| 1,929,517 | 10/1933 | Rockwell | 188/333 |
| 3,047,099 | 7/1962 | Dahle | 188/331 |
| 3,951,243 | 4/1976 | Chouings | 188/331 |

FOREIGN PATENT DOCUMENTS

| 717045 | 1/1942 | Fed. Rep. of Germany . |
| 50476 | 11/1940 | France . |
| 950315 | 9/1949 | France | 188/331 |
| 1144531 | 10/1957 | France . |
| 1544028 | 10/1968 | France . |
| 2137796 | 12/1972 | France . |
| 842156 | 7/1960 | United Kingdom . |
| 1540595 | 2/1979 | United Kingdom . |

Primary Examiner—Douglas C. Butler
Attorney, Agent, or Firm—Owen, Wickersham & Erickson

[57] ABSTRACT

In a shoe and drum brake wherein the shoes can move circumferentially of the drum between first and second limit positions and are biased towards the first limit positions, there is provided for transmitting force from an actuator to the shoes a lever or hydraulic device capable of transmitting the force unequally to the shoes. The larger force urges the shoes towards their second limit positions while the smaller force urges the shoes towards their first limit positions. During forward rotation of the drum, the shoes remain in their first limit positions and can be applied radially to the drum by movement of the actuator. When the drum is rotating in the reverse direction, the larger force moves the shoes circumferentially of the drum so that the actuator fails to apply the shoes to the drum and establish a braking torque.

12 Claims, 10 Drawing Figures

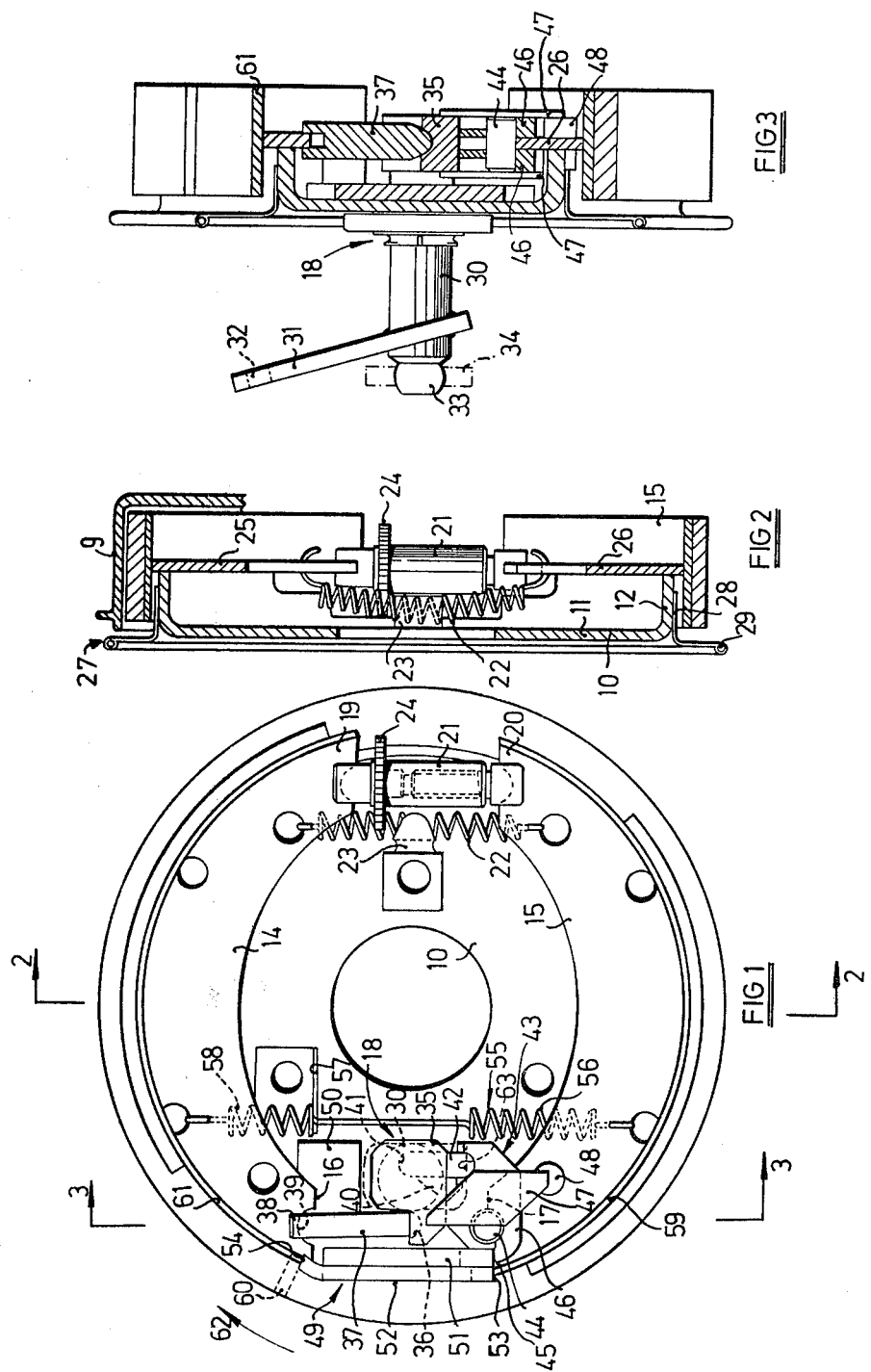

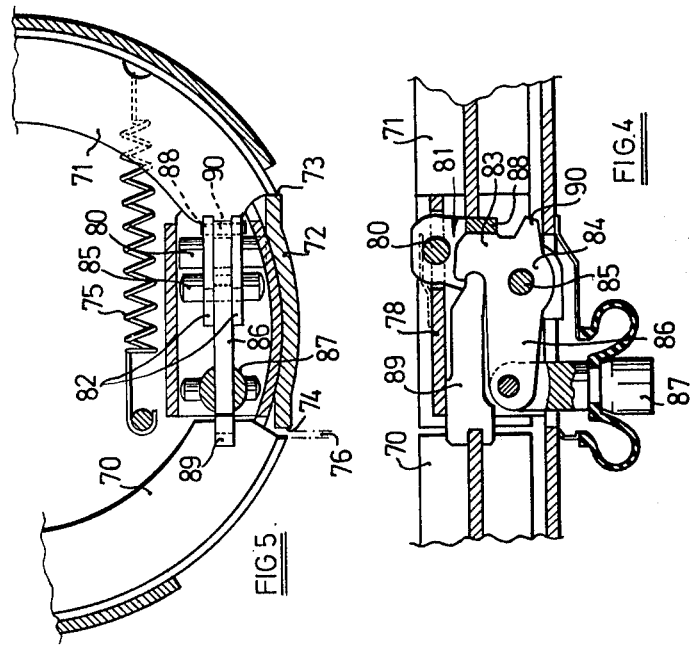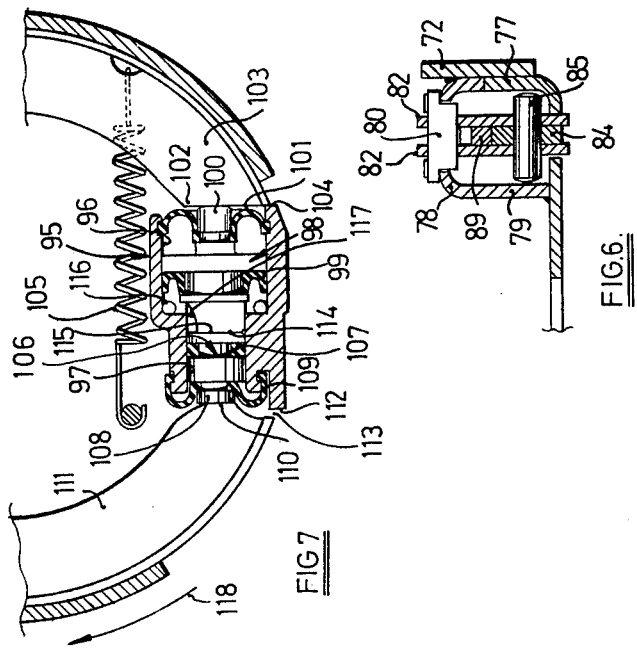

SHOE AND DRUM BRAKE

This is a continuation of application Ser. No. 010,531 filed Feb. 9, 1979, now abandoned.

This invention relates to shoe and drum brakes of the type, hereinafter referred to as being of the type described, in which a given brake actuator input to apply the brake results in a much higher braking torque when the drum is rotating in one direction (hereinafter referred to as the forward direction) than when the drum is rotating in the opposite direction (hereinafter referred to as the reverse direction), the brake mechanism including clearance which is retained during application of the brake during forward rotation of the drum and which is reduced or substantially eliminated upon brake application during reverse rotation of the drum.

The invention finds application in trailer brakes which are applied by the trailer tending to overrun the towing vehicle when the latter slows down. With such trailer brakes it is necessary to make provision for reversing the trailer without applying the brakes or applying them to any substantial extent. The simplest provision is a mechanical spacer which can be moved into position to prevent movement of the tow bar of the trailer to apply the brakes. It has also been proposed to include, in the brake, some mechanism which limits the brake torque in reverse. These mechanisms rely, for their operation, on the changes in direction and magnitude of the forces exerted by the shoes when the drum changes from rotating in the forward direction to rotating in the reverse direction. The brakes of the invention include such mechanism and may be of the leading and trailing shoe kind, the duo-servo kind having primary and secondary shoes, or the bi-directional, two-leading shoe kind in which each shoe acts as a leading shoe during rotation of the drum in either direction.

SUMMARY OF THE INVENTION

According to the invention, there is provided a brake of the type described comprising a drum which is rotatable about an axis, a torque reaction member, two shoes mounted on said member for movement relative thereto circumferentially of the drum and radially of said axis for engaging the drum for exerting braking torque thereon, abutment means on said member for limiting movement of the shoes circumferentially of the drum and thereby defining first and second limit positions of the shoes, biasing means for biasing the shoes towards said first limit positions, actuator means movable relative to said member for applying the shoes to the drum and means for transmitting force from the actuator to the shoes unequally, the larger force urging the shoes towards said second limit positions and the smaller force urging the shoes towards said first limit positions.

During forward rotation of the drum, the larger part of the force transmitted from the actuator means to the shoe is insufficient to move either of the shoes from its first limit position to its second limit position but on braking during reverse rotation of the drum, the larger part of the force transmitted from the actuator means to the shoes is sufficient to move the shoes from their first limit positions towards their second limit positions. This circumferential movement of the shoes avoids the shoes being applied radially to the drum under substantial pressure and thus avoids the generation of significant braking torque during reverse rotation of the drum.

During movement of the trailer on which the brake is mounted, the brake will normally be operated by the trailer overrunning the towing vehicle. It may also be necessary to make provision for the brake to be operated by parking brake means when the trailer is parked. One of the problems associated with the brakes of the type described is that if the trailer is stationary and the brake is applied by parking brake means, unless some provision is made, should the trailer start to move in reverse the brakes will come off because there will have been insufficient actuator movement. This is dealt with in some arrangements by having energy storage devices such as strong springs in the parking brake linkage so that should the trailer start to move in reverse the springs will cause further actuator movement and the brakes will be re-applied. However, the necessity for strong springs increases the force needed to be applied to the parking brake means and is therefore inconvenient.

Where the actuator is required to operate a brake in accordance with the present invention when the drum is stationary, the means for transmitting force from the actuator to the shoes is preferably so arranged that when the drum is stationary an input to the actuator of sufficient magnitude produces shoe-applying forces in a ratio such as to cause the shoes to move as a unit circumferentially of the drum to their second limit positions and to apply the shoes radially to the drum. The ratio of the respective forces transmitted from the actuator to the shoes will normally be at least 3:1.

For transmitting force from the actuator to the shoes there may be provided a lever pivotally connected to one of the shoes and having a fulcrum on the torque reaction member, the actuator being in force-transmitting relation with the lever at a position thereon at the side of the lever pivot remote from the fulcrum. There may be provided on the shoe to which the lever is pivotally connected a stop engageable with the lever for limiting pivoting of the lever relative to the shoe.

In an alternative arrangement, the actuator is a body of liquid contained in a housing defining two intercommunicating bores of relatively smaller and larger cross sectional areas. For transmitting force from the liquid to the shoes, there are provided two pistons, one in each bore. The piston which is slidable in the larger bore is arranged to act on one of the shoes for urging the shoes towards the second limit positions and the other piston is slidable in the smaller bore and arranged for acting on the other of the shoes to urge the shoes towards the first limit positions.

A brake in accordance with the invention may further comprise an adjustable mechanism for limiting movement of a shoe away from the drum and an element for adjusting said mechanism when, during rotation of the drum in a direction from the second limit position towards the first limit position of one of the shoes, movement of said shoe towards the drum exceeds a predetermined amount, said element being associated with the shoe for movement in a first manner relative to the adjustable mechanism when the shoe moves towards the drum and the drum is rotating in said direction and for movement in a second manner relative to the adjustable mechanism when the shoe moves towards the drum and from its first limit position towards its second limit position.

BRIEF DESCRIPTION OF THE DRAWINGS

FIG. 1 shows an elevation of one example of a brake embodying the invention, a drum of the brake being removed;

FIG. 2 is a section of the brake of FIG. 1 on the line 2—2 of FIG. 1, only part of the drum being shown;

FIG. 3 is a section of the brake of FIG. 1 on the line 3—3 of FIG. 1 the drum being omitted entirely;

FIGS. 4, 5 and 7 are detailed views showing an alternative form of actuator which can be used in the brake of FIGS. 1 to 3;

FIG. 7 is a detail view showing a hydraulic actuator which can be used in the brake of FIGS. 1 to 3;

DETAILED DESCRIPTION

Figure 8:
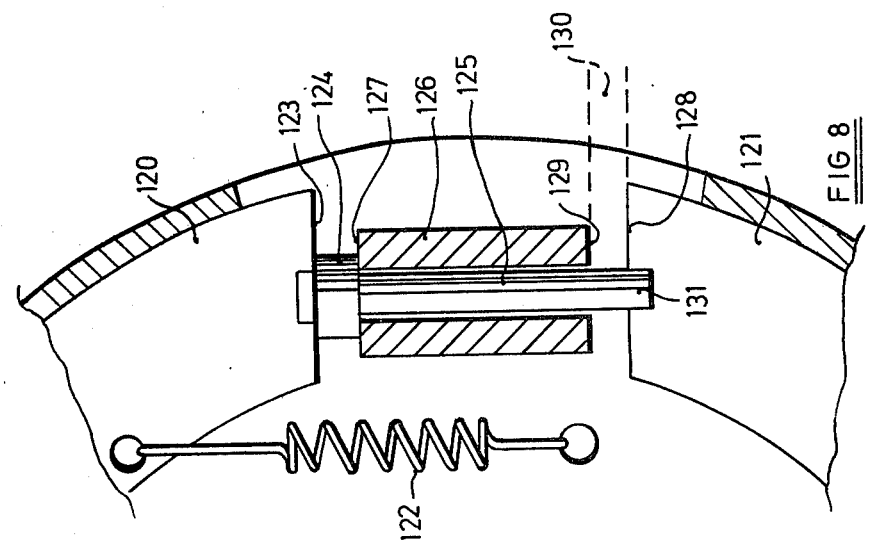
FIG. 8 is a detail view of a strut arrangement which can be used with a leading and trailing shoe brake.

The brake shown in FIGS. 1 to 3 is of the duo-servo type and comprises a torque reaction member in the form of a brake back plate 10. The back plate is of dished construction having a base 11 and a peripheral flange 12. Mounted on the back plate is a primary brake shoe 14 and a secondary brake shoe 15. Arranged between the one ends 16 and 17 of the shoes 14 and 15 respectively is an actuator indicated generally at 18 and interposed between the other ends 19 and 20 of the shoes is a strut 21. A spring 22 having its ends engaged with the shoes forces the ends 19 and 20 into engagement with the ends of the strut. The strut is of the conventional adjustable type whose length can be increased to compensate for wear of the shoe linings. The spring 22 is engaged by a bracket 23 which, as shown in FIG. 2 causes the spring to engage the adjustable wheel 24 of the strut to prevent undesired rotation thereof.

It will be seen from FIG. 2 that the flange 12 of the backplate engages the webs 25 and 26 of the shoes 14 and 15 and locates the shoes. A dust cover indicated at 27 has a hollow spigot 28 and a flange 29 which closes the rear of the brake drum, not shown. The dust cover can be used with brakes having shoes of different widths by varying the amount of overlap of the spigot 28 and the flange 12.

The actuator 18 comprises a shaft 30 having secured thereto an arm 31 having an aperture 32 to engage a brake rod, not shown. The left-hand end of the shaft in FIG. 3 is provided with a spherical portion 33 supported in a fixed bearing 34. The shaft carries a head 35 inside the back plate. The head has a first recess 36 which receives one end of a strut 37 whose other end 38 is bifurcated and received in a notch 39 in the end 16 of the shoe 14. A second recess 40 is provided in the head 35 and in this is engaged one end 41 of a strut 42. The other end of the strut 42 engages a lever 43 pivoted at 44 to the end 17 of the shoe 15 and reacting against an abutment 45 on the back plate 10. As shown in FIG. 3, the lever 43 comprises two plates 46 between which the web 26 of the shoe 15 is received. Plates 47 are welded to the ends of the pivot pin 44 to locate the lever and pin in position and overlap the head 35 and also a further pin 48 carried in the web 26 of the shoe 15.

An L-shaped member 49 has one limb 50 secured to the base 11 of the back plate and the other limb 51 carries an abutment plate 52 whose ends provide abutments 53 and 54 respectively. The end which provides the abutment 53 also provides the abutment 45. A spring 55 has a first part 56 acting between the shoe 15 and a bracket 57 on the back plate and a second part 58 acting between the shoe 14 and the bracket 57. The part 56 is of greater strength than the part 58.

The brake is shown in its off position in the drawing. In this position the spring 56 acts to bias the parts so that the shoe 15 occupies a first limit position with an end of its shoe table 59 engaging the abutment 53. The shoe 14 also occupies a first limit position in which there is a clearance 60 between the abutment 54 and the adjacent end of the shoe table 61 of the shoe 14. The spring 58 retains the shoe 14 in engagement with the strut 37. The direction of forward rotation of the drum is shown by the arrow 62 and during such forward rotation the shoe 14 is the primary shoe and the shoe 15 is the secondary shoe. To apply the brake, the shaft 30 is turned in a clockwise direction as viewed in FIG. 1 thus tending to move the ends 16 and 17 of the shoes 14 and 15 apart. The shaft 30 can slide in a slot 63 in the back plate. The slot is dimensioned to permit rotation of the shaft 30 and to allow it to move in directions parallel to the length of the strut 21 but restrains the shaft 30 from movement in directions perpendicular to the length of the strut 21. The forces applied to the struts 37 and 42 are equal. However, the force applied to the shoe 15 is applied via the lever 43 and the pivot 44, the lever reacting against the abutment 45, and the lever and pivot act as force multiplying means so that the force applied to the shoe 15 for a given actuator input is greater than the force applied to the shoe 14 via the strut 37.

Different conditions occur in the brake when the drum 9 (shown in FIG. 2) is rotating forwardly, when it is rotating rearwardly and when it is stationary. When the drum is rotating forwardly and the brake is applied, the shoe 15 remains in engagement with the abutment 53. The force applied to the shoe via the strut 42 and the lever 43 is insufficient to overcome the sum effect of the bias spring 56 and the clockwise force of the shoe on the abutment due to rotation of the drum and movement of the shoes into engagement with the drum. The shoes are applied by the strut 37 moving the shoe 14 outwardly and the shoe 14 will move circumferentially with the drum and will operate the shoe 15 via the strut 21.

If the brake is off and the drum is rotating in reverse and the brake is then applied then the shoe 15 becomes the primary shoe and the shoe 14 the secondary shoe. The force applied to the shoe 15 by the strut 42 and the lever 43 is now sufficient to overcome the effect of the spring 56 and the resistance to circumferential movement of the shoe 15 and the two shoes and the strut move together as a unit with the ends 19 and 20 of the shoes in engagement with the strut 21 so as to reduce the clearance 60. The movement of the shoes as a unit prevents there being anything but minimal braking torque in reverse. The travel permitted of the actuator during normal service braking when the drum is rotating in reverse is such as to prevent the entire elimination of the clearance 60. As mentioned above this travel will be produced by the trailer overrunning the towing vehicle. Thus for a given actuator input, i.e. that which will prevent the entire elimination of the clearance 60 when the drum is rotating in reverse, full braking torque can be obtained with the drum rotating forwardly and only minimal braking torque with the drum rotating in reverse.

Considering now the situation where the drum is stationary and the brake is off, if the shaft 30 is now turned in a clockwise direction in FIG. 1, the force applied to the shoe 15 via the strut 42 and the lever 43 will be greater than the force applied to the shoe 14 by the strut 37 so that the shoes and the strut as a unit will move round anti-clockwise in FIG. 1 until the clearance 60 is eliminated. The permitted travel of the actuator, when the drum is stationary, and the actuator is operated by the parking brake means, will be greater than that which will be permitted when the drum is rotating in reverse. Approximately when the clearance 60 is eliminated the lever 43 engages the pin 48. This reduces the force multiplication of the lever 43 and thus reduces the travel of the actuator required to move the shoe 15. The purpose of the pin 48, therefore, is to prevent the parking brake means running out of travel as the brake is applied with the drum stationary.

The arrangement of the struts 37 and 42 and the lever 43 act as force dividing means of the actuator thus causing a greater force to be applied to the shoe 15 than to the shoe 14. It is apparent, also, that a greater actuator movement is required to obtain a given braking torque when the drum is rotating in reverse (because the clearance 60 has to be taken up) than when the drum is rotating forwardly. In practice, no more than a minimal braking torque is permitted in reverse by limiting the travel of the actuator operated by the trailer overrun when the drum is rotating in reverse.

Referring now to FIGS. 4 to 6, these illustrate an alternative form of actuator for a brake which is otherwise the same as that described in relation to FIGS. 1 to 3. The brake is again of the duo-servo type and the primary shoe is indicated at 70 and the secondary shoe at 71. An abutment plate 72 is secured to the back plate and provides abutments 73 and 74 for the shoes 71 and 70 respectively. The parts are biased to the position shown by a bias spring 75 so that the shoe 71 engages the abutment 73 and there is a clearance 76 between the shoe 70 and the abutment 74.

As shown in FIG. 6, the flange 77 of the back plate which carries the abutment plate 72 is turned inwardly at 77 and inwardly again at 78 and 79 to provide a bracket which carries a pivot pin 80 for a lever 81. The lever comprises two plates 82 clearly shown in FIGS. 5 and 6 and between them the plates receive one arm 83 of a bell crank 84 pivoted at 85 to the end of the lever remote from its pivot 80. The other arm 86 of the bell crank is connected to a rod 87 which provides the actuator input. Extending between the plates 82 is a bridge piece 88 which engages one end of the shoe 71 and a strut 89 extends between the arm 83 and the end of the shoe 70.

The arrangement of the bell crank 84 and the lever 81 acts as a force multiplying means so that an input applied via the rod 87 to the bell crank 85 is divided so that a greater force is applied to the shoe 71 than to the shoe 70 via the strut 89. This is because the forces developed in the strut 89 and at the pivot pin 85 are substantially equal and the force at the pivot pin 85 tends to move the lever 81 anti-clockwise in FIG. 4 thus acting on the shoe 71 via the bridge piece 88 which is nearer to the pivot 80 than is the pivot pin 85. The difference in leverage can be of the order of 3:1.

Operation of the brake is otherwise as described in relation to FIGS. 1 to 3. The bell crank 84 has an ear 90 which, after the bell crank has pivoted through a predetermined distance, engages the bridge piece 88 to reduce the force multiplication of the lever arrangement. This is to prevent the parking brake running out of travel as described in relation to FIGS. 1 to 3 where the lever 42 engages the pin 48. An advantage of the arrangement shown in FIGS. 4 to 6 is that there are no sliding loads, only pin friction.

Referring now to FIG. 7, this shows an hydraulic actuator which may be substituted for the mechanical actuators of FIGS. 1 to 6. Referring to FIG. 7, the actuator comprises a housing 95 having formed therein a first bore 96 and a second bore 97. The bore 96 is of greater cross sectional area than the bore 97. Slidable in the bore 96 is a piston 98 carrying a sealing washer 99 and a projection 100 passing through a sealing boot 101, the projection engaging the end 102 of the trailing shoe 103. The end 102 of the trailing shoe engages an abutment 104 on the right-hand end of the housing under the influence of a bias spring 105. Slidable in the bore 97 is a piston 106 carrying a sealing washer 107 and having a projection 108 which passes through a sealing boot 109 to engage the end 110 of the primary shoe 111. As shown the end 110 is spaced from an abutment 112 on the housing end by a clearance 113. The left-hand end 114 of the piston 98 abuts the right-hand end 115 of the piston 106. Hydraulic fluid enters the communicating bores 96 and 97 through an aperture 116 and the piston 98 is cut away at 117 to permit the hydraulic fluid to enter the bore 97.

It will be seen that when hydraulic fluid is caused to enter the housing there will be a greater force on the piston 98 than on the piston 106. However, when the drum is rotating forwardly as indicated by the arrow 118, the effect of the bias spring 105 and the shoe reactions is such as to retain the secondary shoe 103 in the position shown so that the piston 106 moves outwardly to apply the brake via the shoe 111 and the strut between the shoes 111 and 103. When the drum is rotating in reverse, however, the greater force applied to the shoe 103 by the piston 98 as compared with the force applied to the shoe 111 by the piston 106 will cause the shoes and the strut to rotate as a unit to substantially eliminate the clearance 113. The hydraulic displacement will be limited to prevent the clearance being entirely eliminated when the drum is rotating in reverse, as before, the hydraulic displacement will be effected by the trailer overrunning the towing vehicle.

If it is desired to apply the brake when the drum is stationary additional mechanical means will normally be provided.

Thus far the invention has been described in relation to duo-servo brakes in connection with which it is particularly useful. It may, however, be applied to leading and trailing shoe brakes and in such an arrangement the abutments for the shoes, instead of being associated with the actuator ends of the shoes are associated with the ends of the shoes which engage the strut.

FIG. 8 shows an arrangement which can be substituted for the strut 21 in a brake which is otherwise similar to that shown in FIG. 1. In FIG. 8, the leading shoe during forward rotation is indicated at 120 and the trailing shoe at 121. A bias spring 122, which takes the place of the bias spring 56, urges the shoe 120 into a first limit position in which an end 123 of the shoe engages with a head 124 of a strut 125 passing through a housing 126. The head 124 engages an abutment 127 constituted by one end of the housing. The spring 122 also acts indirectly on the trailing shoe 121, via the shoe 120 and the strut 125, to urge the trailing shoe 121 also into a first limit position in which an end 128 of the shoe is spaced from an abutment 129 constituted by the other end of the housing by a clearance 130. As shown in FIG. 8, an end 131 of the strut 125 engages the end 128 of the trailing shoe.

During forward rotation, which will be in the direction of the arrow 62 in FIG. 1, the greater force applied to the trailing shoe 121 by the actuator in the manner described in relation to FIGS. 1 to 3 will be insufficient to displace the leading shoe 120 from its first limit position. During reverse rotation of the drum however, the shoe 121 becomes the leading shoe and the greater force transmitted to this shoe from the actuator will cause the shoes 120 and 121 together with the strut 125 to move as a unit circumferentially of the drum in a counter-clockwise direction towards second limit positions in which the clearance 130 is eliminated and the end 128 of the shoe 121 engages the abutment surface 129. As in the case of the brake described with reference to FIGS. 1 to 3, the actuator input is limited to prevent the shoes reaching the second limit position when the drum is rotating rearwardly.

When the drum is stationary and the brake is applied, the greater force applied to the shoe 121 will cause the shoes and the strut 125 to move as a unit circumferentially of the drum towards their second limit positions. The travel of the parking brake means will be sufficient to move the shoes to the second limit positions and eliminate the clearance 130 so that the shoes will be applied radially to the drum.

Figure 9:
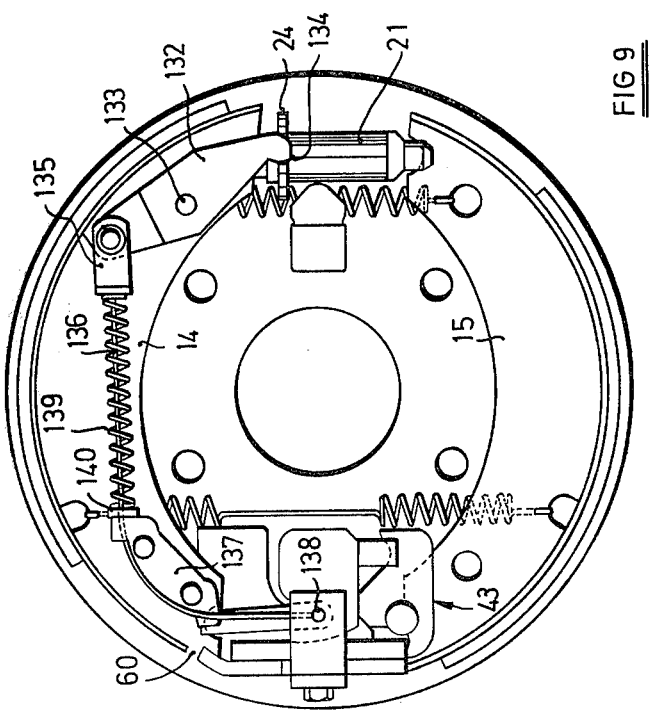
FIG. 9 is a view similar to FIG. 1 but showing the brake provided with an automatic wear adjuster.

FIG. 9 shows the brake of FIGS. 1 to 3 with an automatic wear adjuster and parts in FIG. 9 which are identical to those in FIG. 1 are given the same reference numerals.

The wear adjuster operates on the adjusting wheel 24 of the strut 21 and includes a pawl 132 which is pivoted at 133 to the primary shoe 14. The pawl has an end 134 which engages with the teeth on the adjusting wheel 24. The other end of the pawl is connected to a clevis 135 which in turn is connected to a cable 136. The cable passes around a guide 137 on the shoe 14 and is anchored at 138 to the back plate. A coil spring 139 acts between the clevis 135 and an abutment 140 on the guide 137.

During braking with the drum rotating in the forward direction indicated by the arrow 62 in FIG. 1, the primary shoe will move radially outwardly and circumferentially thus causing the pawl 132 to pivot in an anti-clockwise direction in FIG. 9. Upon the return of the brake parts to their resting positions the pawl returns to the position shown under the influence of the spring 139 and if there has been sufficient wear will engage a tooth on the adjusting wheel 24 and rotate this to increase the length of the strut in a well known manner.

During operation of the brake when the drum is rotating in reverse or when the drum is stationary, however, the shoes 14 and 15 and the strut 21 will move as a unit to reduce or substantially eliminate the clearance 60 and as a result the cable 136 will go slack and no operation of the adjusting wheel 24 will take place.

Figure 10:
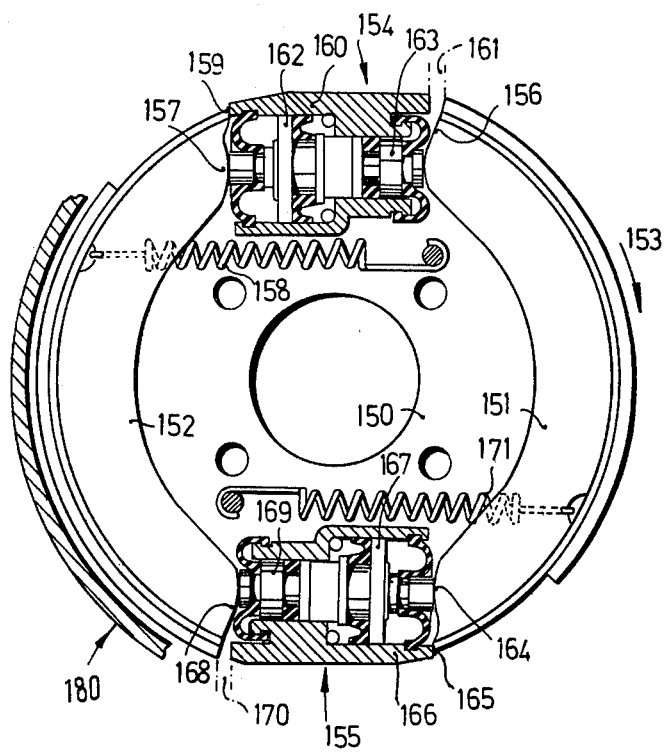
FIG. 10 is a view of a bi-directional, two-leading-shoe brake embodying the invention and including two actuators of the construction shown in FIG. 7, the drum being partly broken away.

FIG. 10 illustrates a brake embodying the invention of the bi-directional, two-leading-shoe type. In this type of brake each of the shoes acts as a leading shoe in each direction of rotation of the drum. The brake comprises a torque reaction member 150 in the form of a back plate and two shoes 151 and 152. The direction of forward rotation of the drum 180 is indicated by the arrow 153. Between each adjacent pair of shoe ends is interposed an actuator, one of the actuators being indicated at 154 and the other at 155. The actuators are hydraulic and are of the form described in detail in relation to FIG. 7. That is to say that each actuator has a piston of larger effective diameter and a piston of smaller effective diameter. The actuator 154 is interposed between the leading end 156 of the shoe 151 and the trailing end 157 of the shoe 152, these ends being leading and trailing when considered in the direction of forward rotation of the drum as shown by the arrow 153. Spring means 158 urges the shoe 152 into a first limit position in which the end 157 engages an abutment 159 on the actuator housing 160 and there is a clearance 170 between the end 168 of the shoe 152 and the housing 166 of the actuator 155. The piston 162 of larger effective diameter associated with the actuator 154 engages the trailing end 157 of the shoe 152 while the piston 163 of smaller effective diameter associated with the actuator 154 engages the leading end 156 of the shoe 151.

In a similar manner, a spring 171 urges the shoe 151 into a first limit position in which the trailing end 164 of that shoe engages the abutment 165 on the housing 166 of the actuator 155. A clearance 161 then exists between the end 156 of the shoe 151 and the housing 160. The trailing end 164 is also acted upon by the larger diameter piston 167 associated with the actuator 155 while the leading end 168 of the shoe 152 is acted upon by the smaller diameter piston 169 associated with the actuator 155.

During application of the brake with the drum 180 rotating forwardly as indicated by the arrow 153, although larger forces are applied to the trailing end 157 and 164 of the shoes than are applied to the leading ends 156 and 158, these greater forces are insufficient to cause the trailing ends to move away from the abutments 159 and 165 respectively. The forces transmitted to the leading ends cause the shoes to be applied radially to the drum 180.

During application of the brake with the drum 180 rotating in reverse, the greater forces applied by the pistons 162 and 167 urge the trailing ends 157 and 164 away from the abutments 159 and 165 respectively so that the shoes 151 and 152 move circumferentially of the drum in an anti-clockwise direction from their first limit positions towards their second limit positions so that the clearances 161 and 170 are reduced. The quantity of hydraulic fluid available for braking when the drum is rotating in reverse is limited so as to prevent the shoes reaching their second limit positions and the generation of any substantial braking torque is prevented.

If braking is required when the drum 180 shown in FIG. 10 is stationary, separate means (not shown) will be provided for applying the shoes to the drum under these conditions. Such means may be effective to displace the shoes from their first limit positions to their second limit positions and then apply the shoes radially to the drum.

The invention provides a number of embodiments of a reversing brake which is simple to manufacture and which, in its duo-servo form, may have an automatic wear adjuster.

I claim:

1. A brake comprising a torque reaction member, a drum which is rotatable relative to the torque reaction member about an axis, two shoes mounted on the torque reaction member for movement relative thereto circumferentially of the drum and radially of the drum for engaging the drum for exerting braking torque thereon, abutment means on said torque reaction member for limiting movement of the shoes circumferentially of the drum in respective opposite directions and thereby defining first and second limit positions of the shoes, biasing means for biasing the shoes in the same direction around the drum towards said first limit position, actuator means moveable relative to said torque reaction member for applying the shoes to the drum and means for transmitting force from the actuator means to the shoes unequally such that the larger force urges the shoes circumferentially towards said second limit position and the smaller force urges the shoes circumferentially towards said first limit position.

2. A brake according to claim 1 wherein said means for transmitting force comprises a lever pivotally connected to one of said shoes and having a fulcrum on the torque reaction member, the actuator means comprises an actuator in force-transmitting relation with the lever at a position thereon at the side of the lever pivot remote from the fulcrum.

3. A brake according to claim 1 wherein said means for transmitting force comprises a lever pivotally connected to one of said shoes and having a fulcrum on the torque reaction member, the actuator means being in force-transmitting relation with the lever at a position thereon at the side of the lever pivot remote from the fulcrum and wherein there is provided on said one of the shoes a stop engageable by the lever for limiting pivoting of the lever relative to the shoe.

4. A brake according to claim 1 wherein said means for transmitting force comprises a lever having a fulcrum on the torque reaction member and a bell crank pivoted on the lever, wherein the actuator is connected to one arm of the bell crank, another arm of the bell crank is connected to one of the shoes and wherein the lever is connected to the other of the shoes in a manner which permits relative pivoting of the lever and the other of the shoes.

5. A brake according to claim 4 wherein there is provided means for limiting relative pivoting of the bell crank and the lever.

6. A brake according to claim 1 wherein the actuator means is hydraulic, comprises a housing defining two intercommunicating bores of relatively smaller and larger cross sectional areas and has two pistons of complementary effective areas one slidable in the larger bore and acting on one of the shoes for urging the shoes towards said second limit positions and the other piston slidable in the smaller bore and acting on the other of the shoes for urging the shoes towards said first limit positions.

7. A brake according to claim 1 further comprising an adjustable mechanism for limiting movement of shoe away from the drum and an element for adjusting said mechanism when, during rotation of the drum in a direction from said second limit position towards said first limit positions, movement of said shoe towards the drum exceeds a predetermined amount, said element being associated with said shoe for movement in a first manner relative to the adjustable mechanism when the shoe moves towards the drum and the drum is rotating in said direction and for movement in a second manner relative to the adjustable mechanism when the shoe moves towards the drum and from its first limit position towards its second limit position.

8. A brake according to claim 7 wherein said mechanism is in the form of a strut, the length of which is adjustable, and said element is in the form of a pawl pivoted to one of the shoes, the brake further comprising a cable whereof one end is connected to said pawl, the cable passing from the pawl round a guide on said shoe and from the shoe in the direction of movement from the first limit position to the second limit position, an end of the cable remote from the pawl being connected to the torque reaction member whereby when the shoe moves from its first limit position towards its second limit position, the cable becomes slack but when the shoe remains in its first limit position circumferentially of the drum and moves radially towards the drum the cable forces the pawl to pivot on the shoe.

9. A brake according to claim 8 further comprising a coil spring surrounding the cable for urging the pawl to an operating position.

10. A brake according to claim 1 wherein the torque reaction member is a back plate of dished form with a peripheral flange, the shoes have webs which cooperate with the flange of the back plate to locate the shoes and there is provided a dust cover which interfits telescopically with the flange of the back plate.

11. A brake according to claim 1 wherein said means for transmitting force from the actuator means to the shoes unequally includes a lever interposed between said actuator and one of said shoes and having a fulcrum on the torque reaction member, wherein the lever produces a mechanical advantage to said actuator, the force exerted by the lever on said one shoe exceeding the force applied to the lever from the actuator.

12. A duo-servo, mechanical, non-hydraulic brake comprising a torque reaction member, a drum which is rotatable relative to the torque reaction member about an axis, primary and secondary shoes both mounted on the torque reaction member for movement relative thereto circumferentially of the drum in two directions and radially of the drum between respective applied positions in which the shoes are applied under pressure to the drum and respective released positions in which the shoes are not so applied, abutment means on the torque reaction member for limiting movement of the shoes circumferentially of the drum in respective opposite directions and thereby defining first and second limit positions of the shoes, biasing means for biasing the shoes relative to the torque reaction member in the same direction around the drum towards said first limit position, a mechanical actuator for receiving force from outside the brake and applying the shoes to the drum, and a lever interposed between the secondary shoe and the actuator and having a fulcrum on the torque reaction member, the force from the actuator being transmitted to the secondary shoe only through said lever, and wherein the actuator is mounted on the torque reaction member for movement relative thereto in a direction extending between the shoes and the lever provides a mechanical advantage to the actuator, the force exerted by the lever on the secondary shoe exceeding the force applied to the lever by the actuator.

* * * * *